UNITED STATES PATENT OFFICE.

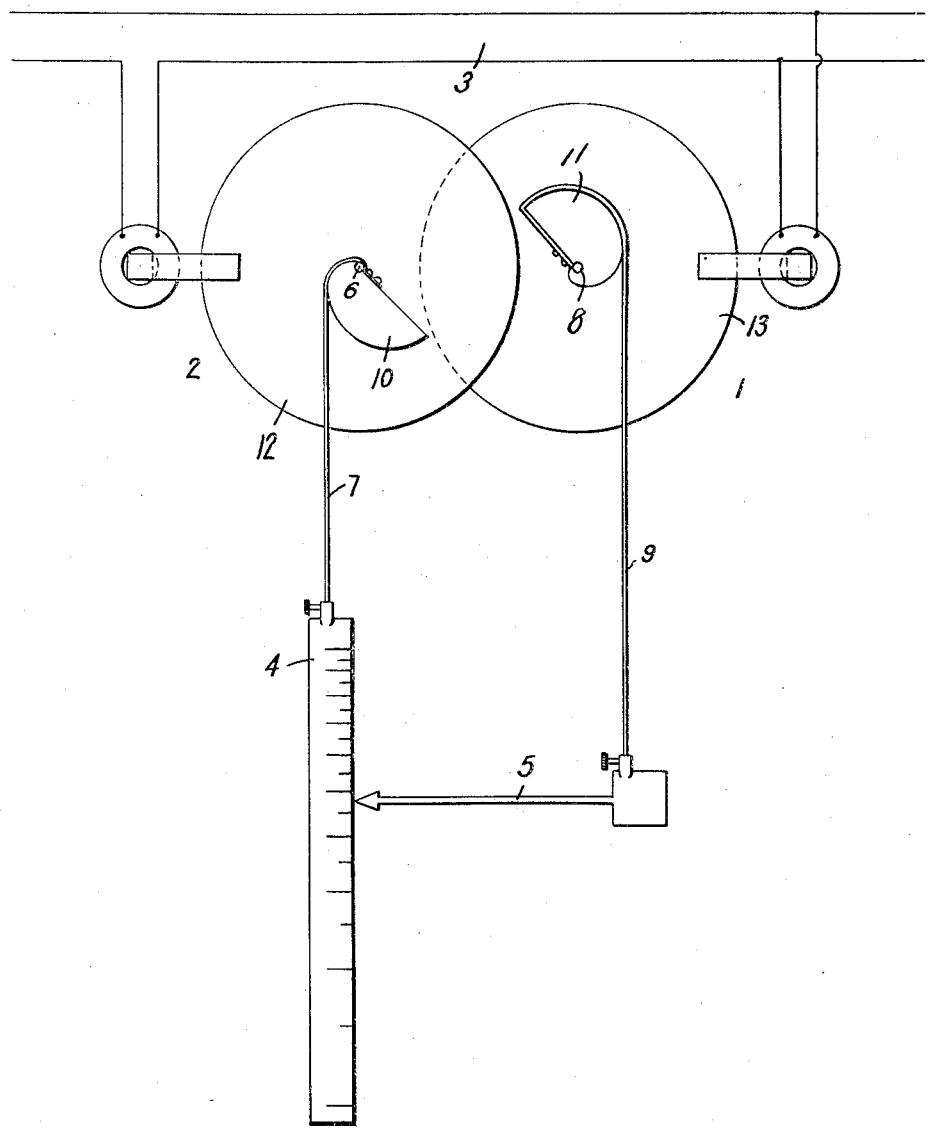

BENJAMIN H. SMITH, OF TURTLE CREEK, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,406,235.      Specification of Letters Patent.      Patented Feb. 14, 1922.

Application filed August 30, 1916. Serial No. 117,647.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Electrical Measuring Instruments, of which the following is a specification.

My invention relates to electrical measuring instruments and particularly to means for, and methods of, determining the volt-amperes or the apparent power traversing an electric circuit.

One object of my invention is to provide means for indicating a value the logarithm of which is equal to the sum of the logarithms of the volts impressed across, and amperes traversing, an electric circuit.

Another object of my invention is to provide a device of the above indicated character that shall be cheap to construct and accurate in its operation.

In the carrying out of my invention, I provide a voltmeter, an ammeter, a movable scale, a movable pointer, means connected between one meter and the scale whereby the scale is actuated in accordance with the logarithm of the displacement of its respective meter, and means connected between the other meter and the pointer whereby the pointer is actuated in accordance with the logarithm of the movement of its respective meter. The scale and pointer are adapted to co-operate to indicate the volt-amperes or the apparent power traversing the circuit, this corresponding to the sum of the two logarithmic displacements.

The single figure of the accompanying drawing is a diagrammatic view of a volt-ampere meter embodying my invention.

A voltmeter 1 and an ammeter 2 are operatively connected to an electrical circuit 3, The ammeter 2 is provided with a movable scale 4 and the voltmeter 1 is provided with a movable pointer 5. The scale 4 is operatively connected to the shaft 6 of the ammeter 2 through a flexible connecting member 7, and similarly, the pointer 5 is operatively connected to the shaft 8 of the voltmeter 1 through a flexible connecting member 9. The ammeter 2 is provided with a cam 10 of substantially the shape of a logarithmic spiral along which the flexible member 7 is caused to be wound. Similarly, the voltmeter 1 is provided with a cam member 11, having a shape substantially the same as that of the cam 10, upon which the flexible member 9 is adapted to be wound.

The scale 4 is graduated in accordance with the scale of logarithmic values but is calibrated for volt-amperes. That is, the division marks are spaced in accordance with the scale of logarithmic values and the values of volt-amperes marked adjacent the positions of corresponding logarithmic values.

If the cam members 10 and 11 are so proportioned that the scale 4 and the pointer 5 are respectively moved in accordance with the logarithms of the displacements of the armatures 12 and 13 of the instruments, the pointer 5 will co-operate with the scale 4 to indicate a value which corresponds to the sum of the logarithms. However, since the sum of the logarithms of two numbers is equal to the logarithm of the product of the numbers the pointer 5 will indicate, in co-operation with the scale 4, the product of the volts impressed across, and the current traversing, the circuit 3.

In operation, the armatures 12 and 13 turn in counter-clockwise directions to unwind the connecting member 7 and to wind the connecting member 9. Thus, since the displacements of the members 7 and 9, and, consequently, 4 and 5, are in opposite directions, and, since the displacement of each member is proportional to the logarithm of its actuating force, the scale 4 may be calibrated to indicate directly, in co-operation with the pointer 5, the volt-amperes traversing the circuit.

While I have shown my invention as particularly adaptable to measuring instruments, it will be understood that it may be applied to other uses and may be variously modified without departing from the spirit and scope of the invention as set forth in the appended claims.

I claim as my invention:

1. A volt-ampere meter for an alternating current electric circuit comprising a co-operating relatively movable scale and pointer, and means for actuating one in accordance with the logarithm of the voltage and the other in accordance with the logarithm of the current traversing the circuit.

2. An alternating-current volt-ampere meter comprising current and voltage-responsive motor devices, a cam of logarithmic-curve shape actuated by each thereof, a scale actuated by one of the cams and a pointer for co-operation with the scale actuated by the other cam.

3. An alternating-current, volt-ampere meter comprising current and voltage-responsive induction meter elements, a cam of logarithmic-curve shape operatively connected to each thereof, a flexible member depending from each cam and adapted to be taken up or released over the logarithmic curve surface, a scale carried by one of said flexible members and a pointer for co-operating with the scale carried by the other flexible member.

4. An alternating-current, volt-ampere meter comprising current and voltage-responsive induction meter elements, a cam of logarithmic-curve shape operatively connected to each thereof, a scale actuated by one of said cams, a pointer for co-operation with the scale actuated by the other cam and means for directly connecting the scale and pointers to their respective cams and thereby preventing lost-motion and friction losses therebetween.

5. A volt-ampere meter for an alternating-current circuit comprising a voltmeter, an ammeter, a movable scale, a movable pointer, means connected between the ammeter and the scale whereby the scale is actuated in accordance with the logarithm of the current traversing the circuit and means connected between the volt-meter and the pointer whereby the pointer is actuated in accordance with the logarithm of the voltage of the circuit.

In testimony whereof, I have hereunto subscribed my name this 26th day of August, 1916.

BENJAMIN H. SMITH.